Figure 1:
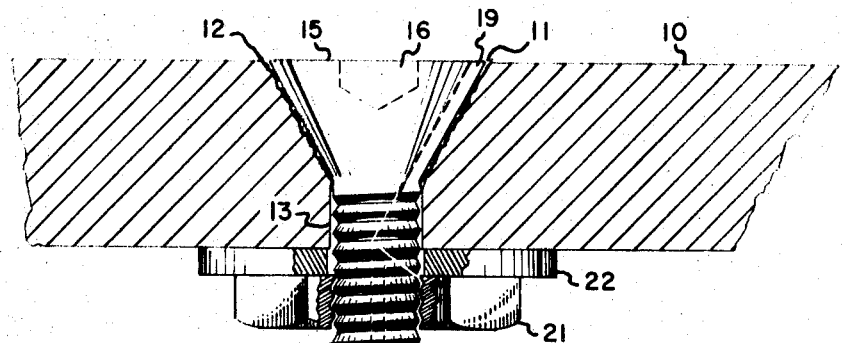

United States Patent

[11] 3,563,471

| [72] | Inventor | Theodore Watkin |
| | | Stamford, Conn. |
| [21] | Appl. No. | 779,561 |
| [22] | Filed | Nov. 27, 1968 |
| [45] | Patented | Feb. 16, 1971 |
| [73] | Assignee | Ivanhoe Research Corporation |
| | | New York, N.Y. |
| | | a corporation of Delaware |

[54] ADJUSTABLE AIR JET ORIFICE
4 Claims, 4 Drawing Figs.

[52] U.S. Cl. .................................................. 239/451;
239/550; 239/587; 239/596; 239/601
[51] Int. Cl. ........................................................ B05b 1/32
[50] Field of Search .......................................... 239/397,
451, 456—460, 538—541, 591, 596, 600, 601,
602, 284, 498, 550, 587, (Pattern Digest), (Nozzle Digest)

[56] References Cited
UNITED STATES PATENTS
1,472,669  10/1923  Overbaugh ............. 239/Pattern Digest

| 1,565,380 | 12/1925 | March .......................... | 239/550UX |
| 1,737,831 | 12/1929 | Curtis ............................ | 239/451 |
| 1,880,880 | 10/1932 | Dietsch ........................ | 239/460X |

FOREIGN PATENTS

| 928,690 | 6/1963 | Great Britain ................ | 239/547 |
| 130,010 | 11/1950 | Sweden ........................ | 239/456 |

Primary Examiner—M. Henson Wood, Jr.
Assistant Examiner—John J. Love
Attorney—Robertson, Bryan, Parmelee & Johnson ABSTRACT: A rotationally adjustable (aimable) orifice or nozzle for fluid under pressure is made by combining a coupling (screw) which has a confined channel along the shank and a slot along the shoulder of the screw. A countersunk hole or aperture in a surface receives the coupling and the countersunk portion of the aperture fits against the shoulder of the coupling to form a channel from the slot. The coupling may be held in the aperture by a nut, for example and the coupling may be turned or rotated in the aperture for directing the flow of fluid exiting from the orifice.

PATENTED FEB 16 1971  3,563,471

INVENTOR.
THEODORE WATKIN

BY

*Kenneth E. Markley*

ATTORNEY

ADJUSTABLE AIR JET ORIFICE

The present invention relates to adjustable fluid jet orifice devices for directionally adjusting the flow of fluid under pressure. In particular, the present invention provides a novel rotationally adjustable (aimable) air jet orifice which is inexpensive to make, easy to assemble, easy and conveniently adjusted, fully rotationally adjustable for aiming a flow of fluid and is fully recessable into a surface.

The invention comprises cooperating components including a coupling, such as a screw or bolt, for example, which has a shank and head and, preferably, a tapered shoulder between the shank and the top of the head and a surface having sufficient thickness to support an aperture for receiving the coupling with a countersunk or tapered portion which closely conforms with the contour of the tapered shoulder of the coupling. The coupling, hereinafter referred to as a "screw," has a hollow section or channel running within the length of its shank. In addition, a slot, running on the outside of the shoulder between the head and the shank meets the channel in the shank and forms a continuous passage along the entire length of the screw.

The aperture in the supporting surface is preferably a tight fit for the screw which is insertable into the aperture. In addition, the aperture is preferably countersunk, essentially conforming to the contour of the shoulder of the screw, when a screw with a tapered shoulder is used.

When the screw is inserted into the aperture the wall of the aperture adjacent the slot in the screw forms the "missing" wall of the slot thereby forming a continuous confined channel, extending the entire length of the screw.

Thus, a screw having a joined channel and slot extending along its length when combined with a fitted aperture of a supporting surface effectively provides a continuous confined channel, essentially extending along the entire length of the screw. This continuous confined channel terminates in the top of the supporting surface and may serve as an air jet.

The slot in the screw may be straight walled or tapered. The screw may be rotated in either direction (clockwise or counterclockwise) through the entire range of 360°.

The screw may have any contour head, i.e. flat, half-round, round, etc., however, a flat head screw is preferred. This type of head forms a flush surface, which is desirable.

It is usual for a screw and/or bolt to have a slot or other means in the top of the head thereof by which the screw may be rotated by use of a screw driver or wrench. Preferably the screw used in the present invention has a hexagon recess or "Allen"-type head for inserting a hexagon wrench or "Allen" wrench. Such wrench may be used for rotationally adjusting or aiming the jet. A star recess or "Phillips"-type recess or slot head screw may be used if desired.

The invention is characterized by its simplicity and rotational adjustability.

If desired, a sealant or liner, in the form of resilient film, for example, may be used between the shoulder of the screw and the wall of the tapered portion of the aperture to more positively seal the slot and form a tightly confined channel. The screw may be made of metal or plastic or any material normally used for screws.

Preferably the aperture is a smooth wall aperture, i.e. without threads. With this construction the screw may be rotated in the aperture and still remain snuggly seated in the aperture.

It is therefore an object of the present invention to provide an adjustable jet orifice for fluids under pressure in which part of the channel for conducting the fluid is formed by a slot in a portion of a coupling and the portion of the wall of a countersunk or contoured aperture adjacent to such slot.

Another object is to provide a rotationally adjustable jet orifice for air under pressure in which part of the channel for conducting the air is formed by a slot in the tapered shoulder of a screw and a portion of the wall of a countersunk aperture provides the closure portion for forming a channel when the screw is inserted in the aperture.

Figure 2:
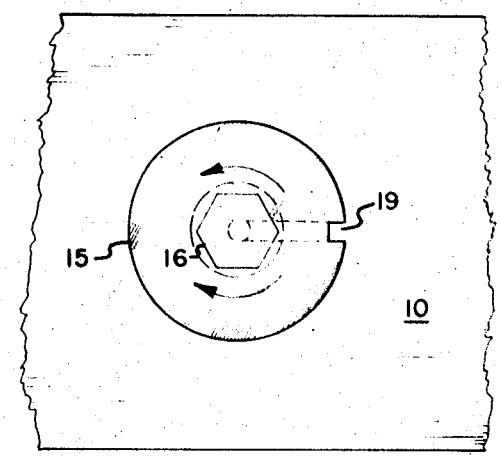
Figure 3:
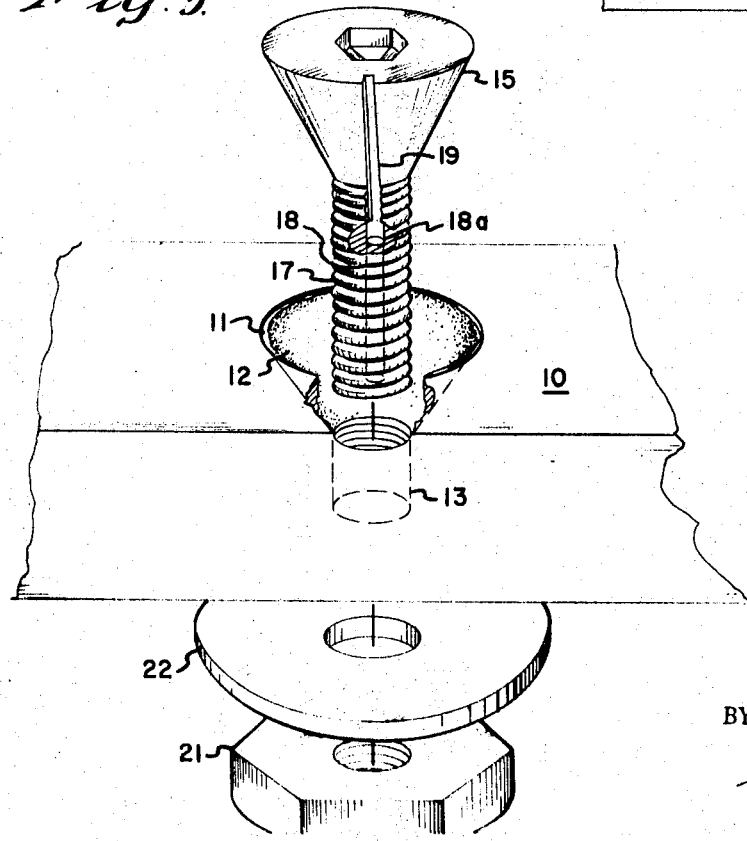
Figure 4:
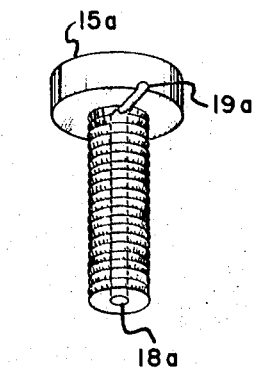

These and other objects will become apparent from reading the following detailed description with reference to the drawings in which:

FIG. 1 is a side elevation view of the preferred embodiment of the invention;
FIG. 2 is a plan view of the embodiment of FIG. 1;
FIG. 3 is an exploded view of the embodiment of FIG. 1; and
FIG. 4 is a view of an alternate form of coupling usable in the invention.

Referring to the FIGS. in more detail, a surface 10 having a thickness is shown with an aperture 11. The aperture 11 has a tapered portion or shoulder 12 and a straight portion 13. This is conventionally referred to as a countersunk hole.

A coupling, represented in its preferred form by a screw 15 is shown in FIG. 1 inserted in the aperture 11. In FIG. 2 the top or head of the screw 15 is seen. FIG. 3 shows the screw 15 removed from the aperture 11 and shows the internal or wall portions forming the aperture.

The screw is of the conventional type having a means in the head for rotating the screw by use of a tool. The means in the head of screw 15 is shown as a hexagon recess 16. The shank 17 of the screw 15 is threaded but the straight portion 13 of the aperture is smooth. In some cases the coupling 15 may have a smooth shank, such as a rivet.

The shank of the screw has a bore or channel 18 which at its upper end connects with a slot 19. FIG. 3 shows the slot 19 meeting the channel 18 at 18a.

The screw 15 is shown inserted into the aperture 11 such that the tapered portion 12 of the aperture 11 fits closely to the shoulder of the screw 15 essentially converting the slot 19 to a channel which opens at the top of the surface 10.

The screw 15 is held in the aperture by a conventional nut 21 and a washer 22. The washer 22 may serve as a seal. If the shank of the coupling is smooth, the coupling 15 may be held in the aperture by a clamp or other friction gripping means.

FIG. 1 shows a hose or tube 23 coupled to the shank 17 of the screw 15. The hose 23 may serve to conduct fluid or air under pressure to the channeled screw.

The shoulder or countersunk portion 12 of the aperture 11 may include thereon a relatively thin, resilient film for providing a seal.

The screw 15 may have a slotted head or a "Phillips"-type recess. The top of the head may be flat, as illustrated or may be half-round or any other contour.

A flat head screw maintains a flush surface and is preferred.

FIG. 4 shows, in alternate form, a round head screw 15a which has a flat shoulder. The slot 19a is under the head of the screw and the surface 10 and rim of the aperture cooperate with the slot to form a channel.

As seen clearly from the drawings, the orifice provides a type of rotationally adjustable nozzle which when the screw is rotated by use of a tool, for example, may rotationally direct the stream or jet of air coming out of the orifice or, in this case, a nozzle.

Thus the preferred form of the invention has been shown and described and several alternate forms have been described. Substitution and changes in parts may be made, as will be familiar to those skilled in the art, without departing from the spirit of the invention as defined in the appended claims.

I claim:
1. A rotationally adjustable orifice for rotationally directing a jet of air with respect to a stationary supporting surface including:
   a coupling having a head and a shank with an outwardly extending shoulder between said head and shank;
   said shank having a bore extending longitudinally therein;
   said shoulder having a slot therein extending outwardly thereof, the inner end of said slot communicating with said bore;
   a surface member supporting said coupling and having a smooth walled aperture therein for receiving said shank and said shoulder;

said aperture conforming closely with the contour of said shank and said shoulder whereby said slot is converted into a closed wall channel extending along said shoulder and communicating with the said bore at its upper extremity for defining a complete channel extending longitudinally of said coupling with the said channel communicating with the top of said surface;

gripping means engaging said shank for holding said coupling in said aperture; and means for conducting fluid to said bore for creating a jet of said fluid at the top of said surface member.

2. A rotationally adjustable orifice jet device as in claim 1, and said coupling further includes a recess in the head thereof, adapted to receive a tool for rotating said coupling with respect to said surface for directing a jet of fluid coming out of the top of said channel.

3. A rotationally adjustable orifice jet device as in claim 1, and in which the shoulder of said coupling is tapered, extending outwardly and the aperture for receiving said shoulder is countersunk and forms an area of said aperture which conforms to the tapered contour of said shoulder for receiving said tapered shoulder exclusive of said slot.

4. A rotationally adjustable orifice jet device as in claim 1, and in which the exterior surface of said shank of said coupling is threaded and said gripping means includes means adapted to be threaded to said threaded shank of said coupling.